United States Patent [19]

Carpenter

[11] 4,281,767

[45] Aug. 4, 1981

[54] TRAWLER FISH-SORTING SYSTEM

[76] Inventor: Robert C. Carpenter, 628 SE. 3rd St., Newport, Oreg. 97365

[21] Appl. No.: 70,153

[22] Filed: Aug. 27, 1979

[51] Int. Cl.³ .............................................. B07C 7/04
[52] U.S. Cl. .................................... 209/703; 209/942; 193/3; 414/140; 114/255
[58] Field of Search ............... 209/702, 703, 704, 705, 209/942, 941; 211/10; 114/255, 26; 56/8, 9; 119/3; 43/6.5; 414/140; 193/3

[56] References Cited

U.S. PATENT DOCUMENTS

| 2,566,086 | 8/1951 | Lehmann | 43/6.5 |
| 3,052,354 | 9/1962 | Luketa | 209/703 |
| 3,581,892 | 6/1971 | Aro | 209/941 |

FOREIGN PATENT DOCUMENTS 1330871  5/1963  France ..................... 114/255

Primary Examiner—Allen N. Knowles
Attorney, Agent, or Firm—Kolisch, Hartwell & Dickinson

[57] ABSTRACT

A fish-sorting apparatus for use on board a fishing vessel of the type including fish-storing bins. The apparatus includes a surface for sorting fish, by category, into different selected ones of the bins, or overboard (for rejected fish), through ports and adjustable chutes which communicate with the surface.

4 Claims, 2 Drawing Figures

TRAWLER FISH-SORTING SYSTEM

BACKGROUND AND SUMMARY OF THE INVENTION

This invention relates to a fish-sorting apparatus usable on board a fishing vessel such as a trawler. When a trawler is engaged in mid-water trawling, the catch is likely to be of one kind of fish traveling in a school. However, when trawling for bottom fish, the catch will typically consist of many different species of fish, shellfish as well as rocks and debris. Such a catch necessitates sorting, whereby the marketable species are separated from the unmarketable or illegal ones, and storing each marketable species in a separate bin.

A common procedure is to spill or dump the catch from the fishing nets onto the deck or into bins of the fishing vessel, and thence to sort or shovel the fish into bins, or overboard, depending on species and/or size. This method is time-consuming and involves very hard labor. The fish sorting work involves repetitive bending on the part of the fish sorter and, when the ocean is even slightly choppy, the work typically causes pain in the sorter's back.

A general object of this invention is to provide a novel apparatus which enables a ship's crew to sort a great number and variety of fish in shorter time and with less effort than ever before.

More specifically, an object of this invention is to provide a fish-sorting surface (such surface allowing the sorter to sort in an upright position), with a plurality of ports communicating with that surface, and chutes for directing fish from the ports into storage bins or overboard.

Another object of the invention is to provide ports and chutes which are detachably mounted, with the chutes taking the form of selectively adjustable passage sections, with each section adapted to direct fish from a port into any one of a number of preselected bins located in the hold of the vessel, or unwanted species and debris overboard.

The kind of fishing vessel with respect to which the present invention is contemplated for use is a trawler having a hopper for receiving a catch, with the hopper having four sides (one such side being pivotally attached to the hopper adjacent the lower portion thereof) and a bottom slanted toward a conveyor, such conveyor suitable for transporting the contents of the hopper to the above-mentioned fish-sorting surface. The hopper's bottom is slanted so that fish slide into the bottom of the conveyor and are thus lifted to the sorting surface.

In trawling for bottom fish, a net is hauled out of the water by a winch, the hopper door is closed, and the catch is spilled into the hopper located on the afterdeck of the trawler. The contents of the hopper are then transported on a conveyor from the hopper onto the fish-sorting surface. The fish-sorting surface herein includes a pair of laterally hinged-together inclined panels, at opposite sides of which are located two troughs positioned slightly below to receive fish. During a sorting operation, the outer edges of the panels are spaced above the troughs to expose plural ports that communicate with below-deck storage bins. Also extending from the troughs are overboard chutes for rejected fish and debris. After sorting, the panels are lowered over the exposed ports and seal the ports, making the bins air tight.

These and other objects and advantages will become more fully apparent as the following description is read in conjunction with the accompanying drawings.

DETAILED DESCRIPTION OF A PREFERRED EMBODIMENT

Figure 1:
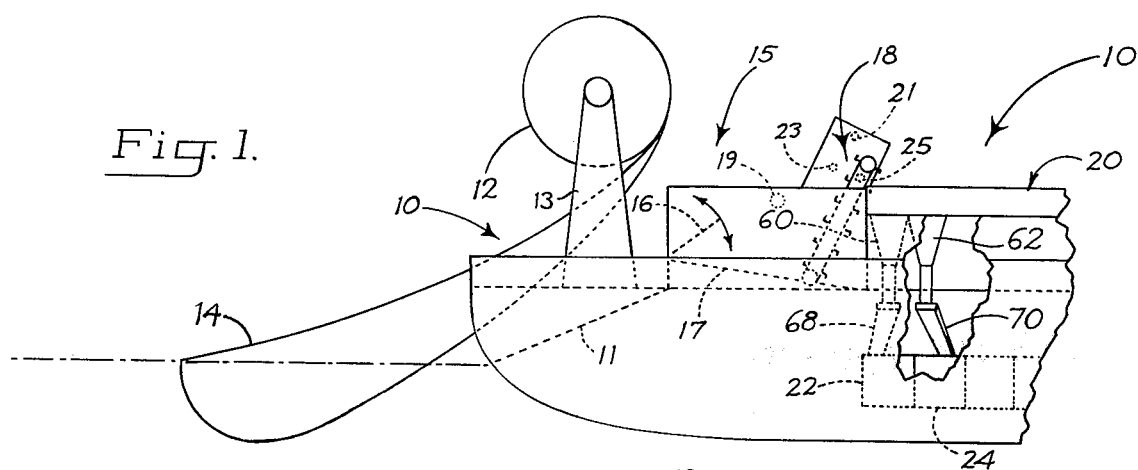
FIG. 1 is a fragmentary simplified side view of the after portion of a trawler employing fish-sorting apparatus constructed in accordance with the present invention.

Turning now to the drawings and referring first to FIG. 1, indicated generally at 10 is the aft portion of a trawler having the usual ramp 11. A conventional net-intake reel 12 is positioned over ramp 11 by a support 13 and another similar support (not visible) located opposite the ramp from support 13. A conventional fishing net 14 is partially submerged in water, and a portion thereof extends up ramp 11 and onto the net-intake reel.

Located generally at 15 is a fish intake hopper. Included therein is a swinging door 16, a slanted floor 17 and a conveyor system 18. Looking now at both FIGS. 1 and 2, also located within the hopper is a rod 19. Rod 19 is attached to the insides of the hopper and runs across the interior thereof. Rod 19 may be detached from the walls and removed. Further included within conveyor system 18 are fish washers 21, 23, 25. The fish washers are hollow tubes having fine holes bored therein, such holes being directed toward the upward driving portion of the conveyor belt. Water under pressure is supplied to the washers thus spraying the conveyor belt.

When it is desired to haul in a full net of fish, a rope (not shown) attached to a winch (also not shown) is attached to the net where it approaches intake reel 12. Door 16 is lowered to the slanted floor and the winch is driven until the net enters the hopper. Rod 19 prevents the net, which is heavily loaded with fish, from swinging into conveyor system 18. Once the net is positioned over the hopper, door 16 is raised to a vertical position so that the hopper is enclosed on all four sides. Rod 19 is removed and the net is opened in a conventional manner so that the hopper is filled with fish. Conveyor system 18 is energized, and the fish are lifted onto apparatus 20, being washed by the fish washers in the process. The slanted floor allows the fish in the hopper to slide toward the base of conveyor system 18 so that ultimately, all the fish in the hopper are lifted onto apparatus 20.

Apparatus 20 in FIG. 1 is simply represented schematically in block form. As will be more fully explained below, apparatus 20 enables the quick, accurate, and convenient sorting of fish into different predetermined categories for direct delivery into below-deck storage bins such as the two designated at 22, 24 in the figure. Bins 22, 24 form part of a row of bins along the near side of the trawler in FIG. 1, with each of these bins having what might be thought of as a mirror-image counterpart located on the far side of the trawler in the figure. Sorting apparatus 20, according to an important feature of the invention, also enables the direct overboard discarding of anything (fish or otherwise) undesired in a catch.

Figure 2:
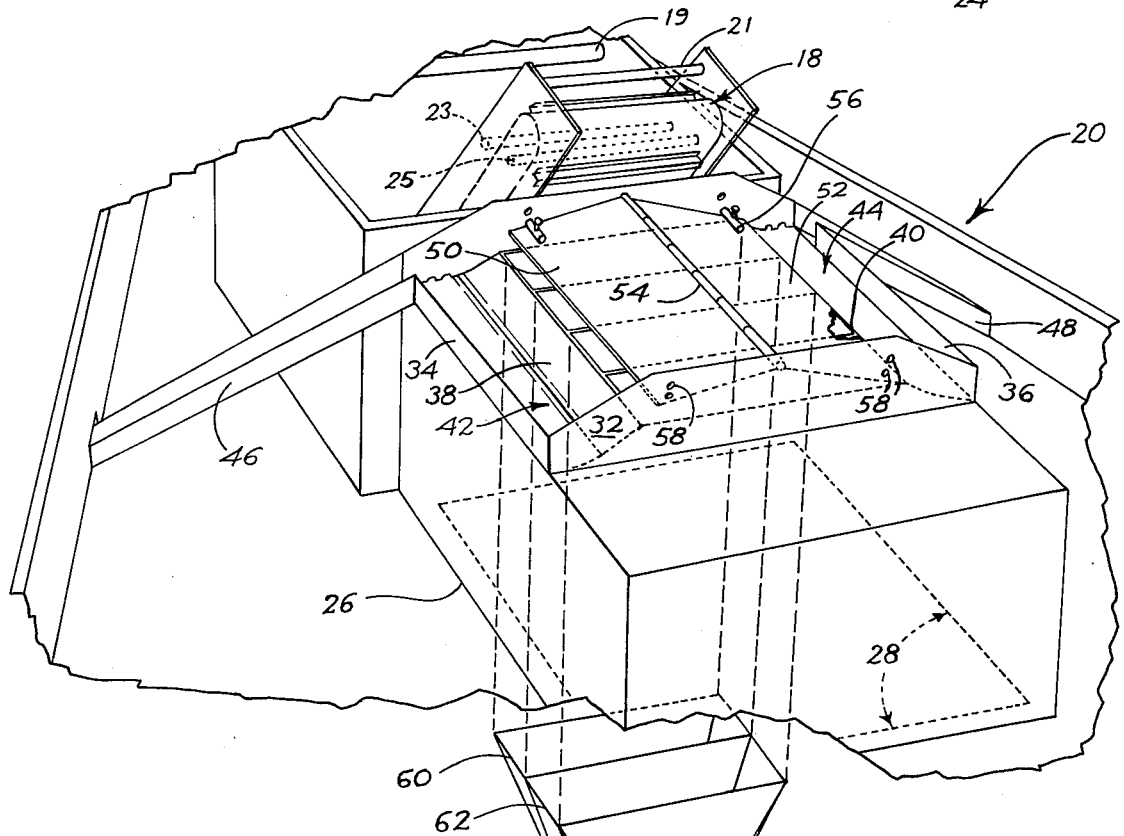
FIG. 2 is a partially exploded perspective view of the fish sorting apparatus employed in the trawler of FIG. 1.
Figure 2:
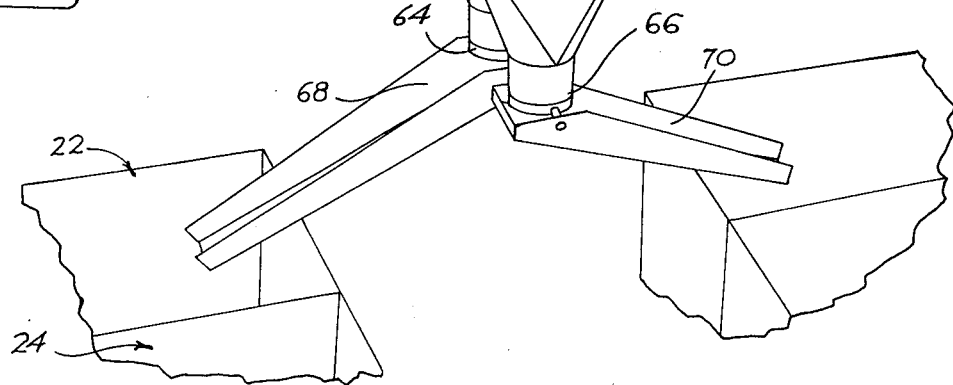

Considering now the details of construction of sorting apparatus 20 with more specific reference to the environment in which the same operates, let us turn attention to FIG. 2. Apparatus 20 is mounted on the trawler through a hollow rectangular box-like frame structure 26 which sits on the trawler's after deck in a position overlying a generally rectangular hold opening shown in dashed lines at 28. Opening 28 exposes the tops of the previously mentioned storage bins.

As will become apparent, apparatus 20 is intended for facilitating manual sorting of an incoming catch, and in the particular embodiment disclosed herein is constructed with what might be thought of as a mirror image symmetry, enabling convenient central lateral placement on the trawler to permit such sorting simultaneously from opposite sides of the apparatus. The perimeter of the sorting apparatus is defined by a pair of end plates, such as plate 32, and a pair of side plates 34, 36. Joining with these plates along opposite sides of the apparatus are two angular lateral base plates 38, 40 which, together with the associated end and side plates, form longitudinally extending fish-receiving receptacles, or troughs 42, 44. Connecting with the rear ends of troughs 42, 44, are chute means including downwardly inclined chutes 46, 48, respectively, whose outer ends extend outward of the trawler through suitable openings in the trawler's bulwark.

Located between the two troughs in the apparatus are two plates 50, 52 which substantially completely overlie the space between the troughs. Plates 50, 52 which are also referred to herein as deck portions, are hinged at 54 with opposite ends of the hinge mounted on end plates 30, 32 above the troughs. Plates 50, 52 are independently swingable to different selected angular positions which will be described, and can be secured releasably in these different positions through slide bolts, such as bolt 56, which are carried on the tops of the plates. These bolts are arranged to engage different apertures, such as apertures 58, formed in end walls 30, 32. The plates and associated troughs form what is referred to herein as a fish-receiving deck, or fish-receiving deck means. Chutes 46, 48 communicating the just-mentioned deck with regions outboard of the vessel are also referred to herein as passage sections.

Extending between and communicating with troughs 42, 44 beneath panels 50, 52 are plural open topped funnels, such as the two shown at 60, 62 in FIG. 2 exploded below the earlier described portions of apparatus 20. In the particular embodiment of the sorting apparatus disclosed herein, four such funnels (only two of which are shown) are employed. The upper openings of these funnels are coplanar and substantially flush with the confronting edges of the troughs. Mounted at the base of each funnel through a swivel connection, such as swivel connections 64, 66, for funnels 60, 62, respectively, are lateral extenders, such as those shown at 68, 70, for funnels 60, 62, respectively. These extenders can be swung to different selected angular positions to place their discharge ends over different storage bins. While different specific lengths for the extenders may be used, each extender herein has a length sufficient to communicate with a pair of adjacent bins in each of the two lateral rows of bins mentioned earlier. With specific reference to extenders 68, 70, the discharge end of the former communicates with bin 22 and the discharge end of the latter communicates with the oppositerow counterpart of bin 22. The funnels, such as funnels 60, 62, thus form passage-defining means, or passage sections, communicating the troughs in the fish-receiving deck with the bins in the vessel.

There are many advantages offered by the above-described apparatus. As can be seen in the drawings, when trawling for fish, the fish net with the catch is pulled over the pulleys by a winch and the catch is spilled into the hopper. The contents of the hopper are then moved by the conveyor and delivered to the sorting apparatus by allowing the fish etc. to fall on hinged plates 50, 52. When the plates are both adjusted to slope downwardly from their hinged connection, the sloping surfaces of these plates randomly direct the fish etc. into troughs 42, 44. Plates 50, 52 also may be adjusted to direct fish etc. into only one of the troughs, by placing one of the plates in a raised position substantially in the plane of the other, downwardly sloping plate. A crew member standing next to a trough sorts the catch of different marketable species into the appropriate ports. Further, he discards unmarketable species and debris from the trough into the chute leading overboard.

The trawler is made ready for unloading a sorted catch by lifting the fish-sorting apparatus to expose hold opening 28, and lowering a container into the ship's hold through opening 28.

While a preferred embodiment of the invention has been described herein, it is appreciated that variations and modifications may be made without departing from the spirit of the invention.

It is claimed and desired to secure by Letters Patent:

1. Fish-sorting apparatus for use on board a fishing vessel of the type including a plurality of fish-sorting bins, said apparatus in operative condition comprising
   fish-receiving deck means disposed above said bins including a pair of side-by-side adjacent deck portions which are hinged together along their adjacent sides for adjustment to different angular orientations, and
   passage means including, for each deck portion, at least a pair of passage sections, with one operatively communicating between said portion and at least one of said bins, and the other operatively communicating between said portion and a region outboard of the vessel,
   said deck portions, in one set of relative angular orientations, sloping downwardly away from the hinged connection therebetween toward said passage means, and in another angular orientation occupying a substantially common inclined plane.

2. Fish-sorting apparatus for use on board a fishing vessel of a type including a fish-storing bin, said apparatus comprising
   means adapted to be mounted above the bin defining a passage communicating with the bin and having an upper opening,
   a pair of troughs mounted to extend along opposed sides of said opening, and
   a pair of plates, mounted side-by-side above opposed side regions of said opening, each plate being mounted for swinging between a lowered position substantially covering the associated side region of said opening, in which position the plate slopes downwardly to direct fish deposited on the plate into the associated trough, and a raised position exposing said opening and sloping upwardly to direct fish deposited on that plate toward the opposed trough.

3. The apparatus of claim 2 wherein said plates are mounted for swinging about a common axis.

4. The apparatus of claim 2 for use onboard a fishing vessel of a type including a plurality of fish-storing bins, wherein said passage-defining means further includes means selectively adjustable to communicate with different ones of said bins.

* * * * *